United States Patent
Muroyama

[11] Patent Number: 6,126,514
[45] Date of Patent: Oct. 3, 2000

[54] POLISHING SLURRY AND POLISHING METHOD USING THE SAME

[75] Inventor: Masakazu Muroyama, Kanawaga, Japan

[73] Assignee: Sony Corporation, Tokyo, Japan

[21] Appl. No.: 09/264,690

[22] Filed: Mar. 9, 1999

[30] Foreign Application Priority Data

Mar. 12, 1998 [JP] Japan .................................. 10-060911

[51] Int. Cl.⁷ ..................................................... B24D 3/02
[52] U.S. Cl. ................................ 451/36; 51/307; 51/308; 106/3; 451/41
[58] Field of Search ................. 451/36, 41; 51/307–309; 106/3

[56] References Cited

U.S. PATENT DOCUMENTS

| | | | |
|---|---|---|---|
| 4,664,679 | 5/1987 | Kohyama et al. | 51/308 |
| 5,139,571 | 8/1992 | Deal et al. | 51/308 X |
| 5,207,759 | 5/1993 | Mehmandoust et al. | 451/36 X |
| 5,480,476 | 1/1996 | Cook et al. | 51/308 X |
| 5,700,383 | 12/1997 | Feller et al. | 51/308 X |
| 5,800,577 | 9/1998 | Kido | 51/307 |
| 5,846,122 | 12/1998 | Graebner et al. | 451/36 X |

Primary Examiner—David A. Scherbel
Assistant Examiner—Anthony Ojini
Attorney, Agent, or Firm—Hill & Simpson

[57] ABSTRACT

A polishing slurry includes polishing abrasive grains and a polishing liquid containing at least one kind of a fatty acid and a fatty acid ester. The fatty acid is at least one kind selected from a group consisting of oleic acid, myristic acid, and stearic acid. The fatty acid ester is at least one kind selected from a group consisting of butyl stearate, hexyl stearate, heptyl stearate, butyl oleate, hexyl oleate, heptyl oleate, butyl myristate, hexyl myristate, and heptyl myristate. The polishing slurry is used for polishing a surface to be polished of a substance to be polished such as a wafer by bringing the surface to be polished into slide-contact with a polishing surface of a polishing plate mounted to a polishing table while supplying the polishing slurry on the polishing surface. The polishing slurry solves such a related art problem that upon CMP of an interlayer insulating film having a step, a polishing pressure applied to a lower portion of the step becomes equal to that applied to an upper portion of the step, to make the polishing rate at the lower portion of the step nearly equal to that at the upper portion of the step, thereby making it difficult to flatly polish the interlayer insulating film.

5 Claims, 4 Drawing Sheets

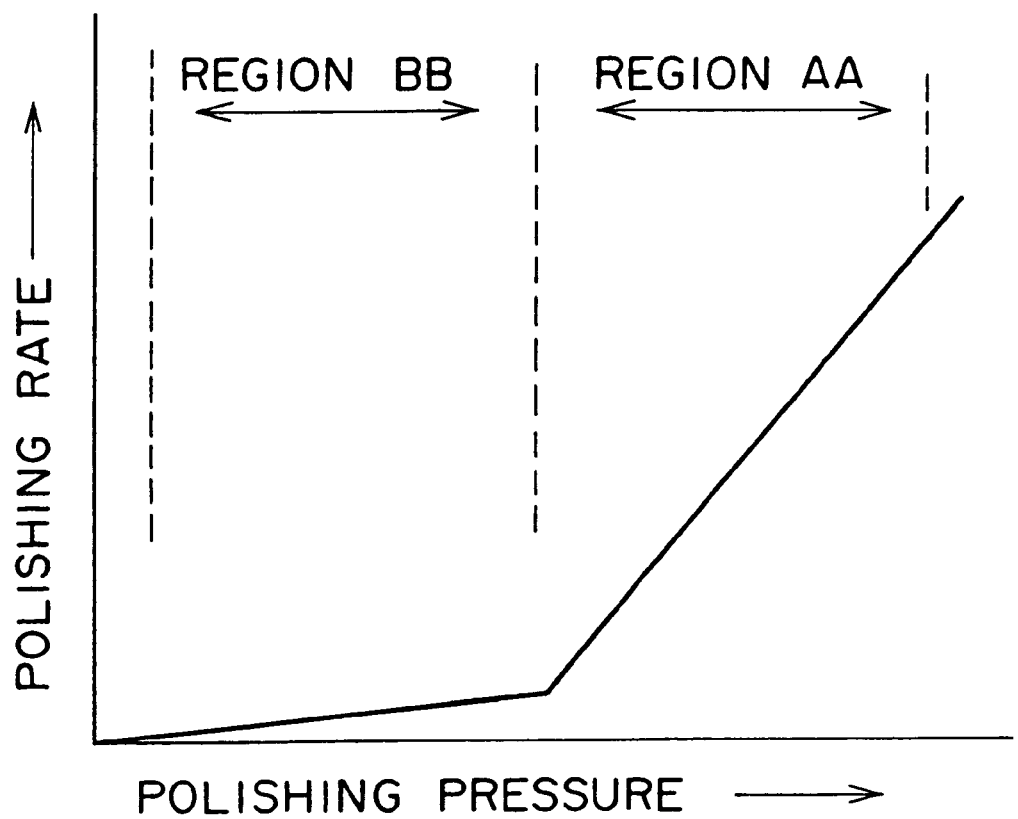

POLISHING SLURRY AND POLISHING METHOD USING THE SAME

RELATED APPLICATION DATA

The present application claims priority to Japanese Application No. P10-060911 filed Mar. 12, 1998 which application is incorporated herein by reference to the extent permitted by law.

BACKGROUND OF THE INVENTION

The present invention relates to a polishing slurry and a polishing method using the same, and particularly to a polishing slurry used for chemical-mechanical polishing performed to eliminate steps on a surface to be processed in a process of fabricating a semiconductor device, and a polishing method using the same.

With the trend toward higher densities of devices, the interconnection technique advances toward finer geometries of interconnection and multilayers of interconnection. Such an advance increases and sharpens steps of interlayer insulating films, to thereby degrade processing accuracy and reliability of interconnections formed thereon. That is to say, higher integration of a device may cause degradation of the reliability of the device. Consequently, under the present technical circumstances in which it is difficult to significantly improve step coverage of an aluminum interconnection, it is required to enhance the flatness of an interlayer insulating film.

As the planarization technique of enhancing the flatness of an interlayer insulating film, there has been reported a chemical-mechanical polishing (hereinafter, referred to as "CMP") technique using fine particles of a silicon oxide dispersed in a basic solution. In this polishing method, a surface to be polished of a wafer on which an interlayer insulating film is formed, is planarized by bringing the surface to be polished of the wafer into slide-contact with a polishing plate (or polishing cloth) mounted on a rotating table while supplying slurry on the polishing plate. The slurry is typically composed of an aqueous potassium hydroxide solution in which fine particles of a silicon oxide having an average particle size of about 10 nm are dispersed.

An example of applying the CMP to planarization of an interlayer insulating film has been disclosed by Beppu, Obara and Minamigawa in Journal of Semiconductor World, [1](1994), p. 58–62, published by Press Journal. In this example, a silicon oxide film and an aluminum interconnection layer are sequentially formed on a silicon substrate; the aluminum interconnection layer is patterned by lithography and reactive ion etching (hereinafter, referred to as "RIE"; an interlayer insulating film is formed on the interconnection layer; and projections of the interlayer insulating film are removed by the CMP to finalize planarizing the interlayer insulating film.

In the meantime, an attempt to planarize multilayers of interconnection by polishing has been made by IBM, which has been known as a Damascen process. One example of the process has been reported by S. Roehl et al. in Proc IEEE (Institute of Electrical and Electronics Engineers) Conf. (USA), p. 22–28, (1992). In this technique, an interlayer insulating film is planarized by polishing; a via-contact hole for connecting upper and lower interconnections to each other and a trench into which an upper interconnection layer is to be formed, are formed by etching; and a metal layer is formed on the interlayer insulating film in such a manner that portions of the metal layer are buried in the via-contact hole and the trench; and a region, other than the portions buried in the via-contact hole and the trench, of the metal layer is removed by polishing, to thereby form a buried metal interconnection in the via-contact hole and the trench.

The above technique of applying the CMP to planarization of an interlayer insulating film, however, has the following problem. That is to say, if an interlayer insulating film has only a region in which interconnections are relatively densely arranged, such a region can be polished into a flat shape; however, as shown in FIG. 3, when an interlayer insulating film 114 has both a projecting region A covering an area in which interconnections 113 are densely formed on a silicon oxide film 112 provided on a silicon substrate 111 and a recessed region B covering an area in which no interconnection is formed on the silicon oxide film 112, a polishing plate 121 is deformed upon polishing of the interlayer insulating film 114 (CMP). Accordingly, a stress applied to the region B becomes equal to that applied to the region A. The polishing rate at the region B is thus made nearly equal to that at the region A, which makes it difficult to reduce, by the CMP, a step formed between the regions A and B. This causes a problem that the exposure focal point at the upper portion of the step does not conform to that at the lower portion of the step upon photo-lithography, thereby making it difficult to form a finer interconnection on the step.

To cope with such a problem, as disclosed by INKIKIM in CMP-MIC Conf. (USA), P. 335–338, (1997), there has been made an attempt to reduce deformation of a polishing plate upon polishing by reviewing the material of the polishing plate. However, the use of a material having only a high hardness simply for improving the hardness of the polishing plate causes a high possibility of occurrence of damages called scratches on the surface of a substrate upon CMP. Further, since polishing abrasive grains are supplied to a wafer from the outer peripheral side thereof, they are less supplied to the center of the wafer, there occurs a problem that the polishing rate becomes significantly fast at the peripheral portion as compared with the center of the wafer.

SUMMARY OF THE INVENTION

An object of the present invention is to provide a polishing slurry capable of flatly polishing an interlayer insulating film and a polishing method using the same.

To achieve the above object, according to a first aspect of the present invention, there is provided a polishing slurry used for polishing a surface to be polished of a substance to be polished by bringing the surface to be polished into slide-contact with a polishing surface of a polishing plate mounted on a table while supplying the polishing slurry onto the polishing surface, the polishing slurry including: polishing abrasive grains; and a polishing liquid containing at least one kind of a fatty acid and a fatty acid ester.

According to a second aspect of the present invention, there is provided a method of polishing a surface to be polished of a substance to be polished by bringing the surface to be polished into slide-contact with a polishing surface of a polishing plate mounted on a table, wherein a polishing slurry used for the polishing method includes: polishing abrasive grains; and a polishing liquid containing at least one kind of a fatty acid and a fatty acid ester.

In general, a fatty acid has a carboxyl group having a high polarity and an alkyl group, and accordingly, the above polishing slurry forms an oil film structure with molecular orientation, in which the carboxyl group having a high polarity is adsorbed on a layer to be polished in a specific orientation. Meanwhile, in general, a fatty acid ester has an ester group having a relatively high polarity and two alkyl groups, and accordingly, the above polishing slurry forms an oil film structure with molecular orientation, in which the ester group having a relatively high polarity is adsorbed on a layer to be polished in a specific orientation.

In this way, the above extreme-pressure additive is adsorbed on the surface of a step of a base body to be polished and forms an oil film structure with molecular orientation, that is, a monomolecular layer, on the surface of the step of the base body. The monomolecular layer is resistant to a polishing pressure, and acts as a lubricating layer capable of relieving a polishing pressure applied to a polishing plate.

The deformation amount of a polishing plate upon CMP is, as disclosed by INKIKIM in CMP-MIC Conf. (USA), p. 335–338, (1997), inverse-proportional to the elastic modulus of a polishing plate. To be more specific, a polishing rate is proportional to a stress (polishing pressure) locally applied to the polishing plate. On the other hand, in polishing using the above polishing slurry added with an extreme-pressure additive represented by at least one kind of a fatty acid and a fatty acid ester, there appears a non-linear relationship between the polishing rate and polishing pressure.

As shown in FIG. 4, the deformation of a polishing plate 21 is large at a region A of the interlayer insulating film 14 covering an area in which interconnections 13 are densely formed on an insulating film 12 provided on a substrate 11. In this case, as is apparent from the above relationship, a polishing pressure $P_A$ applied to the interlayer insulating film 14 at the region A becomes large. Accordingly, as shown in FIG. 5, at a region AA with a large polishing pressure $P_A$, a polishing rate becomes fast. In this figure, the ordinate designates the polishing rate and the abscissa designates the polishing pressure. On the contrary, as shown in FIG. 4, the deformation of the polishing plate 21 is small at a region B of the interlayer insulating film 14 covering an area in which the interconnections are coarsely formed or are not present on the insulating film 12 provided on the substrate 11. In this case, as is apparent from the above relationship, a polishing pressure PB applied to the interlayer insulating film 14 at the region B becomes small. Accordingly, as shown in FIG. 5, at a region BB with a small polishing pressure PB, the polishing rate becomes slow. In this way, the polishing rate thus exhibits a selectivity depending on the shape of a step to be polished.

Since the polishing slurry added with an extreme-pressure additive constituted of a fatty acid and/or a fatty acid ester creates a non-linear relationship between a polishing pressure and a polishing rate, such a polishing slurry is able to suppress occurrence of scratches on a surface to be polished of an interconnection layer or an interlayer insulating film, and hence to highly uniformly, flatly polish the surface to be polished.

BRIEF DESCRIPTION OF THE DRAWINGS

The polishing slurry and polishing method using the same according to the present invention are illustrated schematically in the accompanying drawings in which:

FIG. 5 is a graph showing a relationship between a polishing rate and a polishing pressure.

DETAILED DESCRIPTION OF THE PREFERRED EMBODIMENTS

Figure 1:
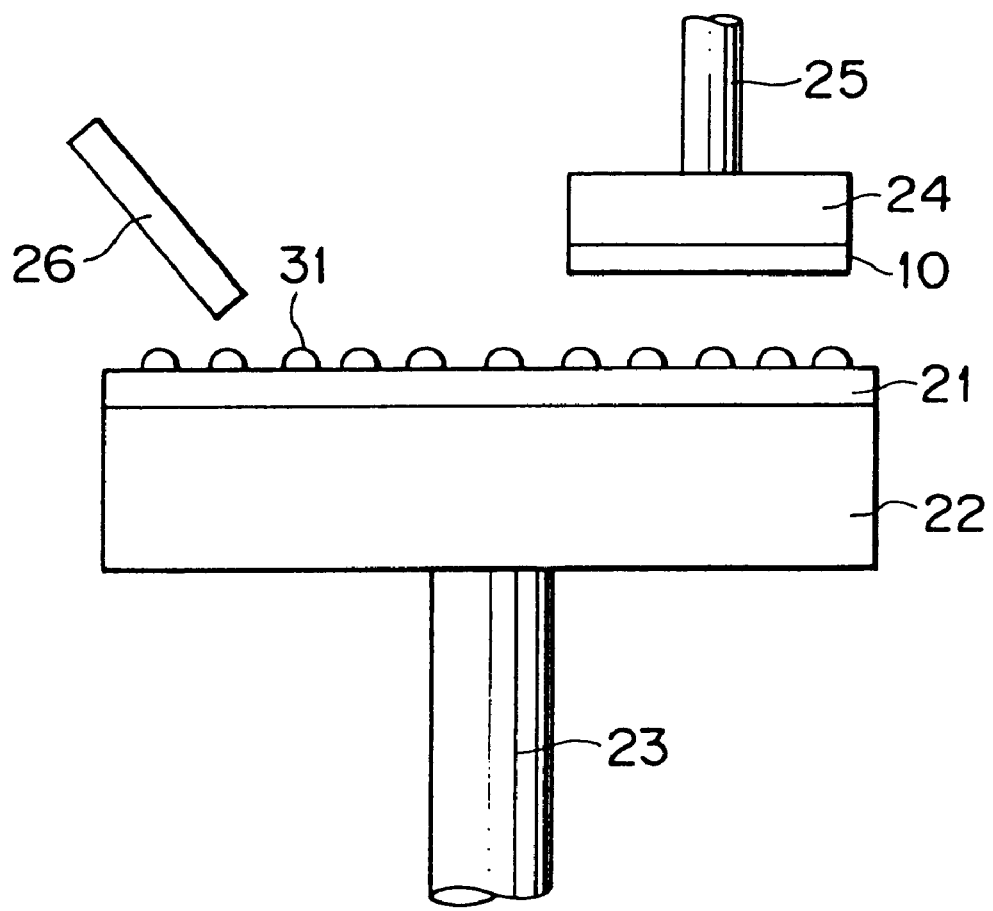
FIG. 1 is a schematic configuration view of a polishing apparatus using a polishing slurry of the present invention.

Hereinafter, one embodiment of a polishing slurry of the present invention will be described. The polishing slurry is used, in a process of fabricating a semiconductor integrated circuit, for planarizing an interlayer insulating film formed on a base body having a step by polishing or for planarizing a metal interconnection layer upon formation of a metal trench interconnection by polishing.

The polishing slurry is, more specifically, used for polishing a surface to be polished of a substance to be polished (for example, an interlayer insulating film or a metal interconnection layer) by bringing the surface to be polished into slide-contact with a polishing surface of a polishing plate mounted on a table by supplying the polishing slurry on the polishing surface. The polishing slurry includes polishing abrasive grains and a polishing liquid containing at least one kind of a fatty acid and a fatty acid ester. The fatty acid is at least one kind selected from a group consisting of oleic acid, myristic acid and stearic acid, and the fatty acid ester is at least one kind selected from a group consisting of butyl stearate, hexyl stearate, heptyl stearate, butyl oleate, hexyl oleate, heptyl oleate, butyl myristate, hexyl myristate, and heptyl myristate.

The content of the fatty acid and/or fatty acid ester may be in a range of 0.01% to 10%, preferably, in a range of 0.1% to 5% in order to exhibit an effect of forming an oil film structure thereby relieving a polishing pressure applied to a polishing plate. If the content of the additive is less than 0.01%, the effect of adding the additive cannot be obtained because the oil film strength cannot be ensured. Meanwhile, if the content of the additive is more than 10%, the additive is liable to remain on the surface of the oxide film after treatment, causing contamination of the wafer. It should be noted that the content of each of the fatty acid and fatty acid ester is expressed in vol % and the same is true for the content of each of a fatty acid and a fatty acid ester to be described later.

The material of the polishing abrasive grains is at least one kind selected from a group consisting of metal oxides, metal nitrides, metal carbonates, metal sulfates, metal halides, metal silicates, metal borates and metal phosphates. Examples of the metal oxides may include silicon oxide, aluminum oxide, titanium oxide, zirconium oxide, cerium oxide, and manganese oxide; examples of the metal nitrides may include silicon nitride, aluminum nitride, and titanium nitride; examples of the metal carbonates may include calcium carbonate, magnesium carbonate, and strontium carbonate; examples of the metal sulfates may include calcium sulfate; examples of metal halides may include aluminum fluoride, calcium fluoride, and magnesium fluoride; examples of the metal silicates may include aluminosilicate, and titanium silicate; examples of the metal borates may include calcium borate, and magnesium borate; and examples of the metal phosphates may include calcium phosphate and magnesium phosphate.

A dispersion medium for abrasive grains, used for the polishing slurry, contains at least water. The fatty acid and/or fatty acid ester are dissolved and dispersed in the diffusion medium containing water. In this case, if the solubility of the fatty acid and/or fatty acid ester in the dispersion medium is insufficient, a ketone based solvent may be added to the diffusion medium in order to increase the solubility of the fatty acid and/or fatty acid ester. The ketone based solvent is a bipolar solvent, and therefore, it can be dissolved with a high solubility in both an aqueous phase and a nonaqueous phase. Examples of the ketone based solvents may include acetone, methyl ethyl ketone, and cyclohexane. The added amount of the ketone based solvent may be in a range of 0.1% to 10%, preferably, in a range of 1% to 3% in order to enhance the solubility of the fatty acid and/or fatty acid ester. It should be noted that the added amount of the ketone based solvent is expressed in vol % and the same is true for the added amount of a ketone based solvent to be described later.

The polishing slurry can be used for polishing either of a silicon oxide film, a metal oxide film, a metal nitride film, an organic compound film, and a metal film containing at least fluorine, phosphorus, arsenic and boron.

In the polishing slurry, at least one kind of a fatty acid and a fatty acid ester is added into a polishing liquid. In general, the fatty acid has a carboxyl group having a high polarity and an alkyl group, and accordingly, the polishing slurry forms an oil film structure with molecular orientation, in which the carboxyl group having a high polarity is adsorbed on a layer to be polished in a specific orientation. Meanwhile, in general, the fatty acid ester has an ester group having a relatively high polarity and two alkyl groups, and accordingly, the polishing slurry forms an oil film structure with molecular orientation, in which the ester group having a relatively high polarity is adsorbed on a layer to be polished in a specific orientation.

Figure 4:
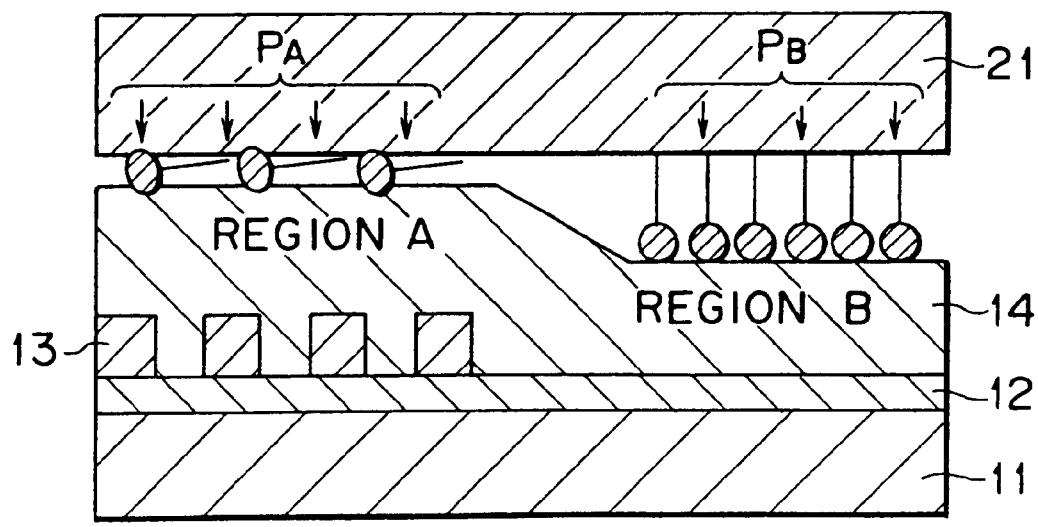
FIG. 4 is a view illustrating the function of the polishing method using the polishing slurry according to the present invention.

In this way, an extreme-pressure additive such as a fatty acid or fatty acid ester is adsorbed on the surface of a step of a base body to be polished and forms an oil film structure with molecular orientation, that is, a monomolecular film, on the surface of the step. The monomolecular film is resistant to a polishing pressure, and acts as a so-called lubricating layer capable of relieving a polishing pressure applied to a polishing plate. Therefore, in polishing using the above polishing slurry, there appears a non-linear relationship between a polishing rate and a polishing pressure. As a result, as described with reference to FIGS. 4 and 5, the polishing rate becomes fast at a region with a high polishing pressure, and it becomes slow at a region with a small polishing pressure. The polishing rate thus exhibits a selectivity depending on the shape of a step to be polished.

In this way, in polishing using the polishing slurry added with an extreme-pressure additive represented by a fatty acid and/or a fatty acid ester, there appears a non-linear relationship between a polishing pressure and a polishing rate, so that it becomes possible to suppress occurrence of scratches on the surface to be polished of an interconnection layer or an interlayer insulating film, and hence to highly uniformly, flatly polish the surface to be polished.

In addition, a fatty acid is extremely high in polarity, and therefore, it is liable to permeate a layer to be polished such as a silicon oxide film. Whereas a fatty acid ester is poor in adsorption ability, oil film formation ability, and permeability to a layer to be polished but is good in durability, as compared with a fatty acid. From these points, it may be desirable to use a fatty acid in combination with a fatty acid ester for forcibly reinforcing an oil film structure of a fatty acid ester low in oil film formation ability but high in durability by adding a fatty acid in a small amount. This makes it possible to achieve an oil film structure having a high durability.

With the increased polishing pressure, it becomes impossible for the above lubricating layer to form a monomolecular layer, so that the lubricating effect of the lubricating layer becomes poorer. As a result, a surface to be polished of a step of a base body is physically brought into contact with abrasive grains added in the slurry, and therefore, it is polished by the abrasive grains. The oil film strength of the monomolecular film (pressure region functioning as a lubricating layer) is determined on the basis of a material forming the monomolecular layer and the content of the material, and by forming an optimum oil film structure through selection of the material forming the monomolecular layer and the content of the material, it is possible to establish a non-linear relationship between a polishing pressure and a polishing rate.

The present invention will be more clearly understood with reference to the following examples:

EXAMPLE 1

In a polishing slurry according to this example, fine particles of silicon oxide having an average primary particle size of 10 nm and an average secondary particle size of 100 nm were used as polishing abrasive grains. The fine particles of the silicon oxide were mixed and diffused in an aqueous potassium hydroxide solution having a pH of 10 at a concentration (solid content) of 12%. The solution containing the fine particles of the silicon oxide was added also with 2% of myristic acid as a fatty acid and 5% of butyl myristate as a fatty acid ester. In this way, the polishing slurry in this example was prepared. It should be noted that the content of each of the fatty acid and fatty acid ester is expressed in vol % and the same is true for the content of a fatty acid and a fatty acid ester to be described later.

The polishing slurry in this example is used, in a process of fabricating a semiconductor integrated circuit, for planarizing an interlayer insulating film formed on a base body having a step by polishing, for example, for planarizing a step of an interlayer insulating film made from silicon oxide provided on aluminum interconnections by the CMP.

A polishing apparatus for carrying out the CMP using the polishing slurry in this example will be described with reference to FIG. 1, and a process of planarizing an interlayer insulating film by the CMP using the polishing slurry in this example will be described with reference to FIGS. 2A to 2C.

The polishing apparatus will be first described with reference to the schematic configuration view of FIG. 1. The polishing apparatus shown in FIG. 1 is of one wafer type, and is not particularly limited in terms of wafer mounting and operation of the apparatus.

As shown in FIG. 1, a polishing plate (or polishing cloth) 21 is held on a polishing table 22. The polishing table 22 is connected to a rotating means (not shown) via a rotating shaft 23. A wafer stage 24 is disposed opposite to the polishing plate 21. The wafer stage 24 is connected to a rotating means (not shown) via a rotating shaft 25. A polishing slurry supply unit 26 for supplying a polishing slurry 31 is provided over the polishing plate 21. A wafer 10 to be polished is fixed on the wafer stage 24 by, for example, vacuum attraction. The wafer stage 24 and polishing table 22, which are independently rotated, are adjusted in arrangement position and rotating speed in such a manner that a polishing rate within a wafer plane is made constant. Accordingly, the polishing rate within the wafer plane upon polishing is fixed. Further, the polishing pressure is controlled by adjusting the pressure for pressing the wafer stage 24 to the polishing plate 21.

Figure 2A:
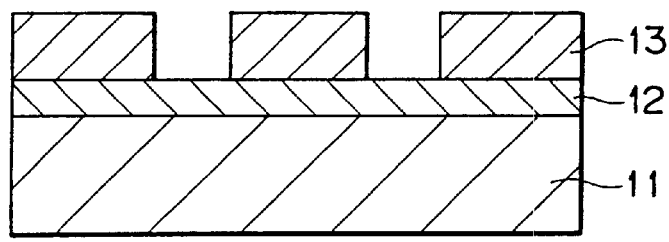
FIGS. 2A to 2C are flow charts showing one example of a polishing method of the present invention.

As shown in FIG. 2A, an interlayer insulating film 12 made from silicon oxide was formed on a semiconductor base body 11 made from silicon; an aluminum interconnection layer was formed on the interlayer insulating film 12, and was then patterned using a resist covered thereon as a mask by lithography and etching, to form aluminum interconnections 13; and the resist used as the etching mask was removed.

Figure 2B:
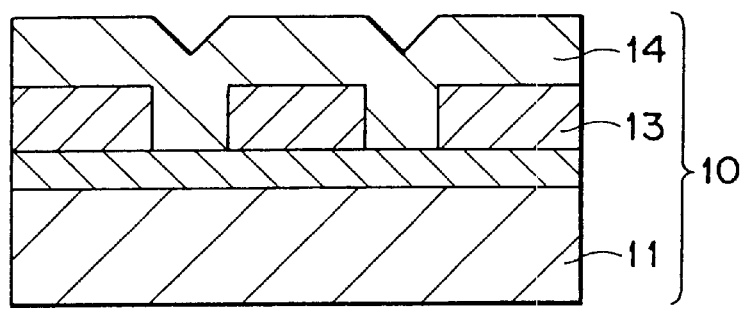
Figure 2C:
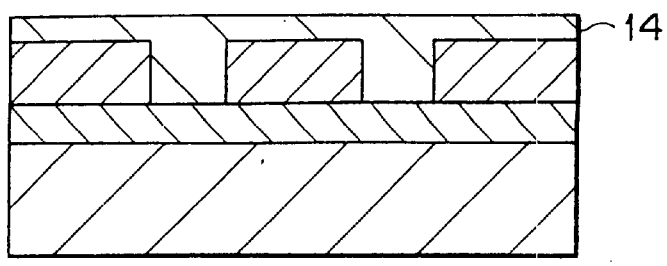
Figure 3:
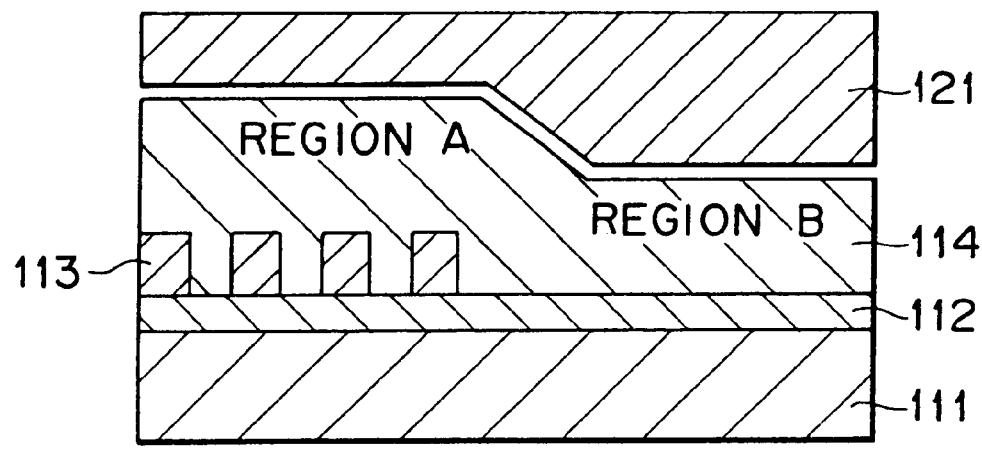
FIG. 3 is a view illustrating a problem caused upon polishing of an interlayer insulating film.

An interlayer insulating film 14 made from silicon oxide was, as shown in FIG. 2B, formed in such a manner as to cover the interconnections 13. In this case, the interlayer insulating film 14 was formed in a state being buried in steps of the interconnections 13. The formation of the interlayer insulating film 14 was performed by CVD (chemical vapor-phase deposition) using as a source gas TEOS (tetraethoxysilane) [flow rate: 800 sccm] and oxygen [flow rate: 600 sccm]. The pressure of the film formation atmosphere was set at 1.33 kPa; the film formation temperature was set at 400° C.; and the RF output was set at 700 W. In this way, the wafer 10 was prepared. It should be noted that the above unit, sccm is the abbreviation of standard cubic centimeters per minute.

To remove the projections of the interlayer insulating film 14 by polishing, the semiconductor base body 11 was held on the wafer stage of the polishing apparatus shown in FIG. 1 and the surface of the interlayer insulating film 14 was polished. Consequently, as shown in FIG. 2C, the projections of the interlayer insulating film 14 were polished to planarize the surface thereof. After that, the polishing slurry (not shown) was removed using an aqueous hydrofluoric acid solution.

In the above polishing method using the polishing slurry 31 added with a fatty acid, the polishing slurry 31 forms an oil film structure with molecular orientation in which a carboxyl group is adsorbed on the surface of the interlayer insulating film 14 to be polished in a specific orientation. Meanwhile, in the above polishing method using the polishing slurry 31 added with a fatty acid ester, the polishing slurry 31 forms an oil film structure in which an ester group is adsorbed on the surface of the interlayer insulating film 14 to be polished in a specific orientation. More specifically, the oil film structure with molecular orientation, that is, the monomolecular film is formed on the surface of the interlayer insulating film 14. Upon polishing, such an oil film structure acts as a lubricating layer capable of relieving a polishing pressure applied to the polishing plate 21, to establish a non-linear relationship between a polishing rate and a polishing pressure. As a result, the polishing rate becomes fast at a region with a high polishing pressure, and it becomes slow at a region with a small polishing pressure. The polishing rate thus exhibits a selectivity depending on the shape of a step to be polished.

As compared with the related art polishing method using no additive constituted of a fatty acid and/or a fatty acid ester, the polishing method of the present invention was improved to reduce the step after polishing to one-tenth the initial step. The polishing method of the present invention was also improved to suppress occurrence of the related art problem associated with scratches due to polishing abrasive grains, and to ensure the high flatness of the surface to be polished. In addition, the polishing method can be sufficiently realized from the practical viewpoint because it exhibits desired characteristics by polishing using the above polishing slurry by the existing CMP apparatus.

In addition, with the increased polishing pressure, it becomes impossible for the above lubricating layer to form a monomolecular layer, so that the lubricating effect of the lubricating layer becomes poorer. As a result, a surface to be polished of a step of a base body is physically brought into contact with abrasive grains added in the slurry, and therefore, it is polished by the abrasive grains. The oil film strength of the monomolecular film (pressure region functioning as a lubricating layer) is determined on the basis of a material forming the monomolecular layer and the content of the material, and by forming an optimum oil film structure through selection of the material forming the monomolecular layer and the content of the material, it is possible to establish a non-linear relationship between a polishing pressure and a polishing rate.

EXAMPLE 2

In a polishing slurry according to this example, fine particles of aluminum oxide having an average primary particle size of 10 nm and an average secondary particle size of 100 nm were used as polishing abrasive grains. The fine particles of the aluminum oxide were mixed and diffused in an aqueous acidic solution having a pH of 4 at a concentration (solid content) of 12%. The solution containing the fine particles of the aluminum oxide was added with 3% of stearic acid as a fatty acid and 5% of hexyl myristate as a fatty acid ester. In this way, the polishing slurry in this example was prepared.

The polishing slurry was used for the CMP of a copper interconnection layer upon formation of copper trench interconnections, and in this case, the same effect as that in Example 1 was obtained.

In the above-described examples, butyl myristate and hexyl myristate are each used as the fatty acid ester contained in the polishing slurry of the present invention; however, the kind of the fatty acid ester contained in the polishing slurry is not limited thereto. For example, butyl stearate, hexyl stearate, heptyl stearate, butyl oleate, hexyl oleate, heptyl oleate, or heptyl myristate may be used as the above fatty acid ester.

While the preferred embodiments of the present invention have been described using the specific terms, such description is for illustrative purposes only, and it is to be understood that changes and variations may be made without departing from the spirit or scope of the following claims.

What is claimed is:

1. A method of polishing a surface by bringing said surface into slide-contact with a polishing surface of a polishing plate mounted on a table,
   wherein a polishing slurry used for said polishing method comprises:
   polishing abrasive grains; and
   a polishing liquid comprising at least one fatty acid and at least one fatty acid ester.

2. A polishing method according to claim 1, wherein said at least one fatty acid is selected from a group consisting of oleic acid, myristic acid and stearic acid.

3. A polishing method according to claim 1, wherein said at least one fatty acid ester is selected from a group consisting of butyl stearate and heptyl oleate.

4. A polishing method according to claim 1, wherein said polishing abrasive grains comprises at least one material selected from a group consisting of metal oxides, metal nitrides, metal carbonates, metal sulfates, metal halides, metal silicates, metal borates and metal phosphates.

5. A polishing method according to claim 1, wherein said surface to be polished is a surface of a semiconductor device.

* * * * *